United States Patent [19]
Wood

[11] Patent Number: 5,497,962
[45] Date of Patent: Mar. 12, 1996

[54] MOORING TOWER ASSEMBLY FOR A LIGHTER-THAN-AIR VEHICLE

[75] Inventor: Wilfred L. Wood, Quartz Hill, Calif.

[73] Assignee: Lockheed Corporation, Calabasas, Calif.

[21] Appl. No.: 322,457

[22] Filed: Oct. 11, 1994

[51] Int. Cl.⁶ .................................. B64F 1/12; B64F 1/14
[52] U.S. Cl. ........................................... 244/116; 244/115
[58] Field of Search .......................... 244/33, 115, 116, 244/161

[56] References Cited

U.S. PATENT DOCUMENTS

| | | | |
|---|---|---|---|
| 1,119,646 | 12/1914 | Schleinitz . | |
| 1,562,310 | 11/1925 | Dill . | |
| 1,683,323 | 9/1928 | Auberlin . | |
| 1,748,500 | 2/1930 | Thaden . | |
| 1,847,634 | 3/1932 | Striefler . | |
| 1,856,446 | 5/1932 | Vingheroetz . | |
| 1,861,780 | 6/1932 | Bowers . | |
| 1,865,790 | 7/1932 | Rosendahl . | |
| 1,867,591 | 7/1932 | Pranke . | |
| 3,905,567 | 9/1975 | Menke et al. | 244/115 |
| 4,009,850 | 3/1977 | Hickey . | |
| 4,177,964 | 12/1979 | Hujsak | 244/161 |
| 4,236,686 | 12/1980 | Barthelme | 244/116 |
| 4,258,888 | 3/1981 | Sawn | 244/115 |
| 4,381,092 | 4/1983 | Barker | 244/161 |
| 4,588,150 | 5/1986 | Bock | 244/161 |
| 4,792,107 | 12/1988 | Fernz | 244/115 |
| 5,143,323 | 9/1992 | Husain | 244/116 |
| 5,347,947 | 9/1994 | Craig | 244/115 |

FOREIGN PATENT DOCUMENTS 267144  3/1927  United Kingdom .

*Primary Examiner*—Andres Kashnikow
*Assistant Examiner*—Virna Lissi Mojica
*Attorney, Agent, or Firm*—Louis L. Dachs

[57] ABSTRACT

The invention is a mooring tower for a for a lighter-than-vehicle. In detail the invention includes a vertical tower having a vertical and lateral axis. A first support member is mounted on the top of said tower, which is rotatable in a horizontal plane about a vertical axis aligned with the vertical axis of the tower. A second support member is mounted by its first end mounted to the first support member and includes a telescoping second end. The second support member is rotatable in a vertical plane about its first end. The second support member includes an aperture extending therethrough from the first end to the second. A winch is mounted to the vertical tower having a mooring line extending through the aperture in the second member from the first end to and out the second end thereof. Thus a vehicle having the end of the mooring line attached to the nose thereof can be winched to the vertical tower.

14 Claims, 7 Drawing Sheets

MOORING TOWER ASSEMBLY FOR A LIGHTER-THAN-AIR VEHICLE

BACKGROUND OF THE INVENTION

1. Field of the Invention

The invention relates to the field of lighter-than-air vehicle docking system, and, in particular, to mooring towers for such vehicles.

2. Description of Related Art

There are basically two types of Lighter-than-air vehicles; rigid or non-rigid. There are three general types of non-rigid vehicles: those comprising a single gas filled bag; several gas bags joined together in series; and, of course, those having a multiple number gas bags within a non-rigid envelope. Rigid airships have an internal structure defining the shape of the vehicle and contain a plurality of gas bags therein and with an outer aerodynamic cover there over. In non-rigid designs the cargo flight station and cargo compartments are suspended from the bottom of the vehicle in what is most often referred to as a gondola. In rigid designs it is also common practice to mount the flight station/passenger and cargo compartments under the gas bag, although many designs integrate them in to the rigid frame of the vehicle.

One of the problems with both rigid and non-rigid lighter-than-air vehicles is their limited ability to station keep and/or maneuver when docking, especially if there are any significant cross-winds. This is due primarily to their large cross-sectional area which makes them sensitive to cross-winds. They are particularly difficult to control if the wind is gusting or when there are significant up or down drafts. In fact, docking has proven to be the most difficult portion of a flight for a lighter-than-air vehicle. Thus the most common docking procedure is moor the vehicle by its nose and let it weather vane.

Additionally, unlike a conventional aircraft, the lift force developed by the gas bag remains when docked. Thus as cargo is unloaded, the net lift force increases. In the past, this increase in the net lift has been absorbed by docking restraints, for example mooring lines. If the cargo weight is very large, the force exerted on the mooring lines becomes large and "station keeping" when docked becomes even more difficult. Therefore, unloading and reloading of cargo sometimes must wait until any winds have sufficiently died down or additional mooring lines must be used to "lock" the vehicle in one position. It is obvious, however, that it is always important to minimize the time spent in such operations.

The docking aspects of the problem was addressed in U.S. Pat. No. 1,119,646 "Device For Landing Or Berthing Airships" by H. V. Schleinitz wherein a rotating platform for docking lighter-than-air vehicles is disclosed. In addition, U.S. Pat. No. 1,867,591 "Dirigible Air Dock" by A. S. Pranke discloses a rail mounted rotating platform. U.S. Pat. No. 1,748,500 "Mooring Of Airships by" H. V. Thaden discloses the use of circular tracks having devices for supporting the vehicle such that the vehicle can align with the prevailing wind. U.S. Pat. No. 1,853,777 "Method Of And Apparatus For Berthing Airships" by W. V. N. Powelson, et al. discloses a rotatable suspension system for docking a lighter-than-air vehicle wherein the suspension system is rotated so that it is aligned with the relative wind. After the vehicle is secured the suspension system is rotated such that the vehicle is aligned with a below ground level pit that is used to shelter the vehicle. While all these concepts allow the vehicle to dock and to weather vane after docking; none of the above concepts addresses the problem of making initial contact with the mooring tower.

In the past, when such lighter-than-air vehicles approached the mooring tower, a mooring line in the nose was extended to the ground and hooked up to the top of the tower. A wrench located on either the mooing tower or the vehicle or both were used to reel the vehicle thereto. However, a simple mooring line often proved inadequate because the vehicle would tend to rotate in a vertical plane about the top end of the tower, making it difficult to secure the vehicle to the ground. In addition, mooring the nose of the vehicle and thereafter the rest of the vehicle presents problems in that wind conditions may shift causing the vehicle to rotate about the nose. If the vehicle is near the ground considerable damage may occur. Therefore it is important to secure the nose of the vehicle while it is still a considerable distance above the ground and to thereafter lower the vehicle down while maintaining it in a horizontal attitude by means of mooring lines attached along its entire length. This problem was addressed in U.S. Pat. No. 1,748,500 "Mooring Of Airships" by H. V. Thaden. In the Thaden device, a tower is provided having an extendible arm mounted on the top thereof that can be rotated about the vertical axis of the tower as well as in a vertical plane. A vertical track extends from the top thereof and extends down the side thereof. This track is coupled to the arm and rotates about the vertical axis with the arm. A winch is mounted to the tower that includes a line that extends through the arm that can be coupled to the nose of the airship. The vehicle is first winched to the end of the arm and then lowered down along the track. However, how the vehicle is initially secured to the end of the arm is not disclosed. In addition, the use of a rotating vertical track on a tall tower designed to accommodate a vehicle some 260 feet in diameter would require a massive and expensive structure. Furthermore, no provisions are provided for coupling of the nose of the vehicle to the top in a wind.

Thus it is a primary object of the subject invention to provide a mooring tower for a lighter-than-air vehicle.

It is another primary object of the subject invention to provide a mooring tower that can accommodate extremely large lighter-than-air vehicles.

It is a further object of the subject invention to provide a mooring tower for a lighter-than-air vehicle that includes means to guide the nose of the vehicle to the top thereof.

It is a still further object of the subject invention to provide a mooring tower for a lighter-than-air vehicle that includes means to guide the nose of the vehicle to the top thereof and to thereafter lower the vehicle to the ground.

SUMMARY OF THE INVENTION

The invention is a mooing tower for a lighter-than-Air vehicle. In detail, the invention includes a vertical tower having a telescoping top end. Mounted on top of the tower is a vehicle securing system that includes a first support member which is mounted on the top of the tower and is rotatable in a horizontal plane about a vertical axis. A second support member is mounted by a first end to the first support member and includes a telescoping second end that terminates in a cup shaped member adapted to mate with the nose of the vehicle having the retrieval line exiting the center thereof. The second support member is rotatable in a vertical plane about its first end and includes an aperture extending therethrough from the first end to the second. Preferably the free end of the first support member is in the form of a clevis and the first end of the second support member is in the form of a lug mounted therein. A winch is mounted to the securing system, preferably to the first or second support members and is rotatable therewith. The winch incorporates a mooring line that extends through the aperture in the second member from the first end to and out the second end thereof for attachment to the nose of the vehicle.

Separate positioning systems are provided for rotating the first support structure about the vertical axis, for rotating the second support member in the vertical plane, for extending and retracting the telescoping first end of the second support member, and for reeling in the retrieval line. Each of the positioning systems includes control systems to limit the amount of restraining force applied to the vehicle. Thus, after the vehicle has been secured to the mooring line, should wind gusts or the like become so great as to cause damage to the vehicle, these force limiting systems acting individually or in combination will limit the restraining forces to safe limits. For Example, the winch can be powered by an electric or hydraulic motor acting through a torque limiting clutch. The first support member can be actuated by a hydraulic or electric motor mounted on the top of tower driving a pinion gear engaged with a ring gear mounted thereabout. A clutch mounted between the motor and pinion gear limits the actuation force. Preferably, the actuation system for the second support member is a hydraulic cylinder coupled between it and the first support member. A pressure regulator controlling the pressure with the hydraulic cylinder is used to limit the actuation force to a preset level. The telescoping end of the second support member can also be hydraulically actuated in a similar manner. Of course, there are numerous other types of actuation or control architectures that can be used.

In operation, as the vehicle approaches the tower, the winch is unwound dropping the end of the mooring line to the platform, while the vehicle drops a pickup line. The two lines are manually joined and the vehicle retracts its line pulling the mooring line up to the nose where it is automatically coupled thereto. Thereafter, the ship maneuvers using its propulsion systems and adjusting the ballast, while the vehicle securing system is used to bring the vehicle to the tower. This is accomplished by individually or in combination: retracting the mooring line; rotation of the first and second support members and retraction of the telescoping end of the second support member. The forces applied to the vehicle are always limited to a level that prevents damage to the vehicle and it becomes a "tug of war" as gusts or propulsion forces are accommodated. Simultaneously, or after the nose of the vehicle is secured to the tower, the mooring lines along the length of the vehicle are used to secure it the platform. Thereafter, the tower is retracted as the mooring lines along the length of the vehicle are used to pull it down to the platform.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
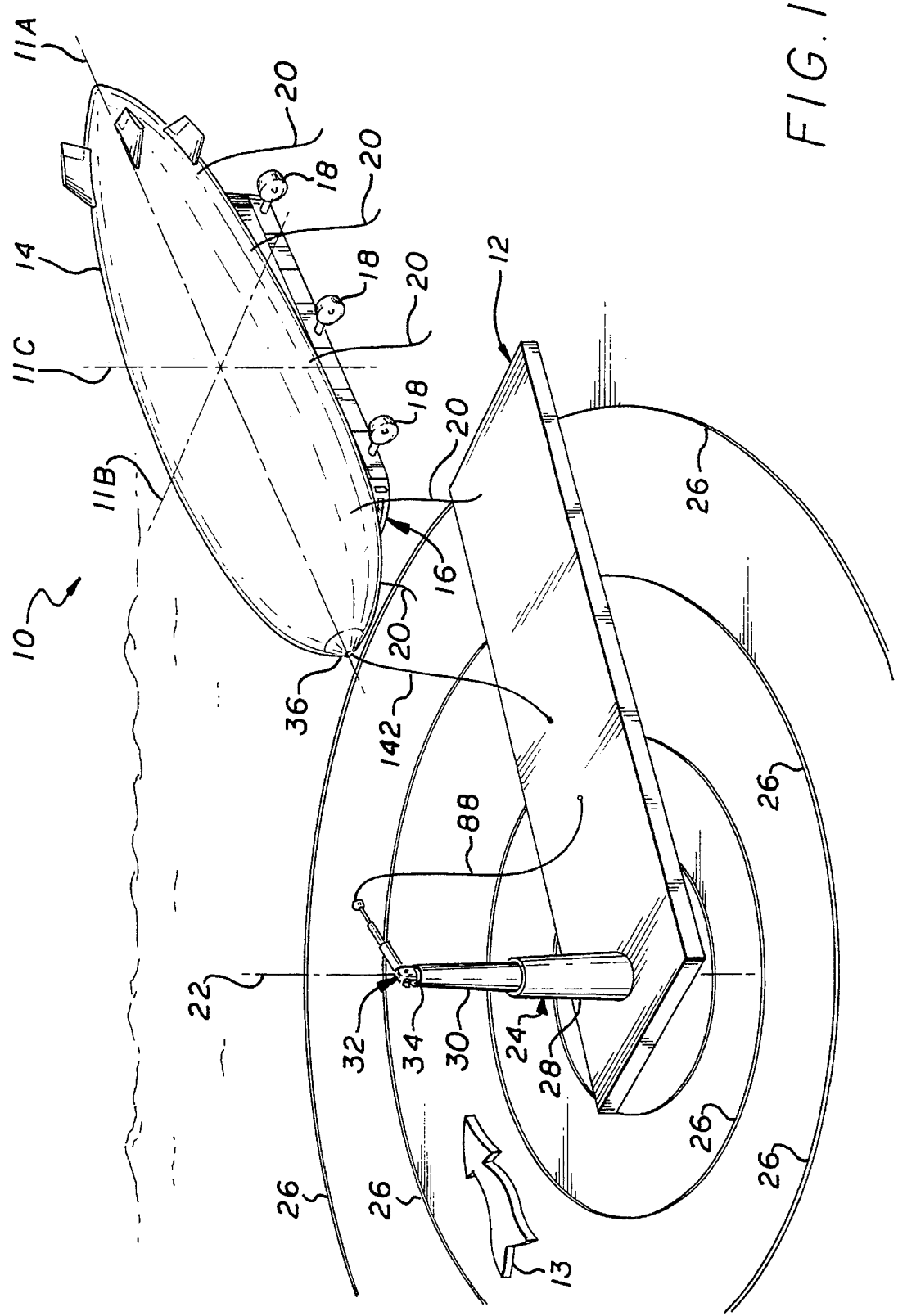
FIG. 1 is a perspective view of a lighter-than-air vehicle approaching the subject mooring tower assembly for docking thereto.
Figure 10:
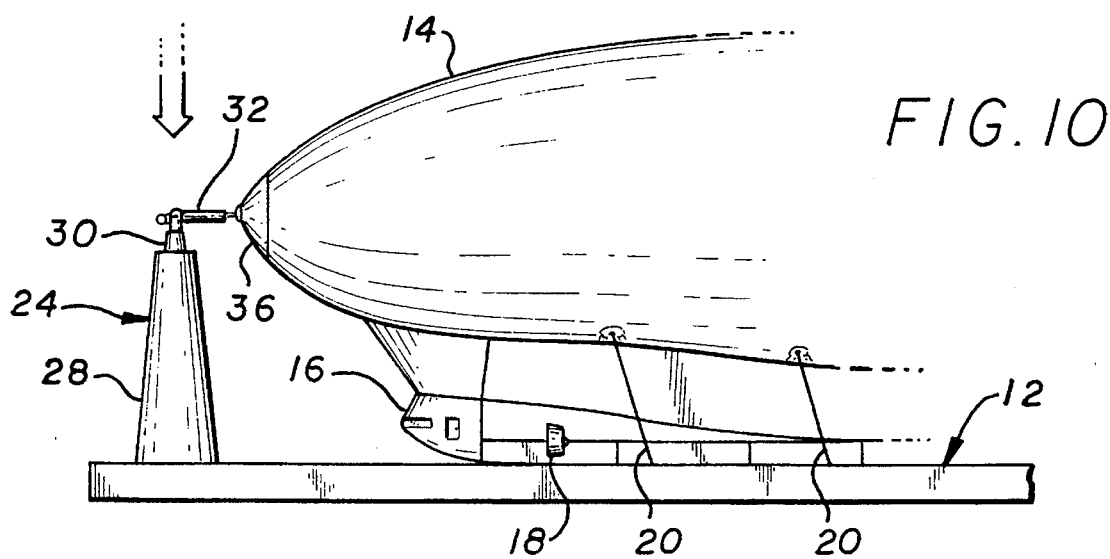
FIG. 10 is a side view of the tower illustrated in FIG. 1 in a retracted position with the vehicle secured thereto

Illustrated in FIG. 1 is a lighter-than-air vehicle, generally indicated by numeral 10 having a longitudinal axis 11A, lateral axis 11B and vertical axis 11C. It is shown approaching a docking platform 12 heading into the wind, who's direction is indicated by numeral 13. The vehicle 10 includes a gas bag 14 having a gondola 16 suspended therebelow having a plurality of powerplants 18 mounted thereon. Mooring lines 20 are shown extended from the gas bag for securing the vehicle to the platform. The platform 12, is rotatable about one end 22 (vertical axis of rotation) having a mooring tower 24 coincident therewith and is also shown in a position under the vehicle 10 aligned with the wind direction 13. The platform 12 further includes a plurality of wheels (not shown) in engagement with circular rails 26 having their center co-incident with the axis of rotation 22 thereof. A powerplant (not shown) is mounted on the platform and is coupled to one or more of the wheels for driving the platform about the axis of rotation 22. The mooring tower 24 includes a stationary lower portion 28 and a telescoping upper portion 30 with a vehicle securing system 32 mounted on the top 34 thereof. Referring to FIG. 10, the vehicle. 10 when docked, in a manner to be subsequently discussed, is coupled by its nose 36 to the tower 24 by means of the securing system 32 and the gas bag 14 is strapped down to the platform by the mooring lines 20.

Figure 2:
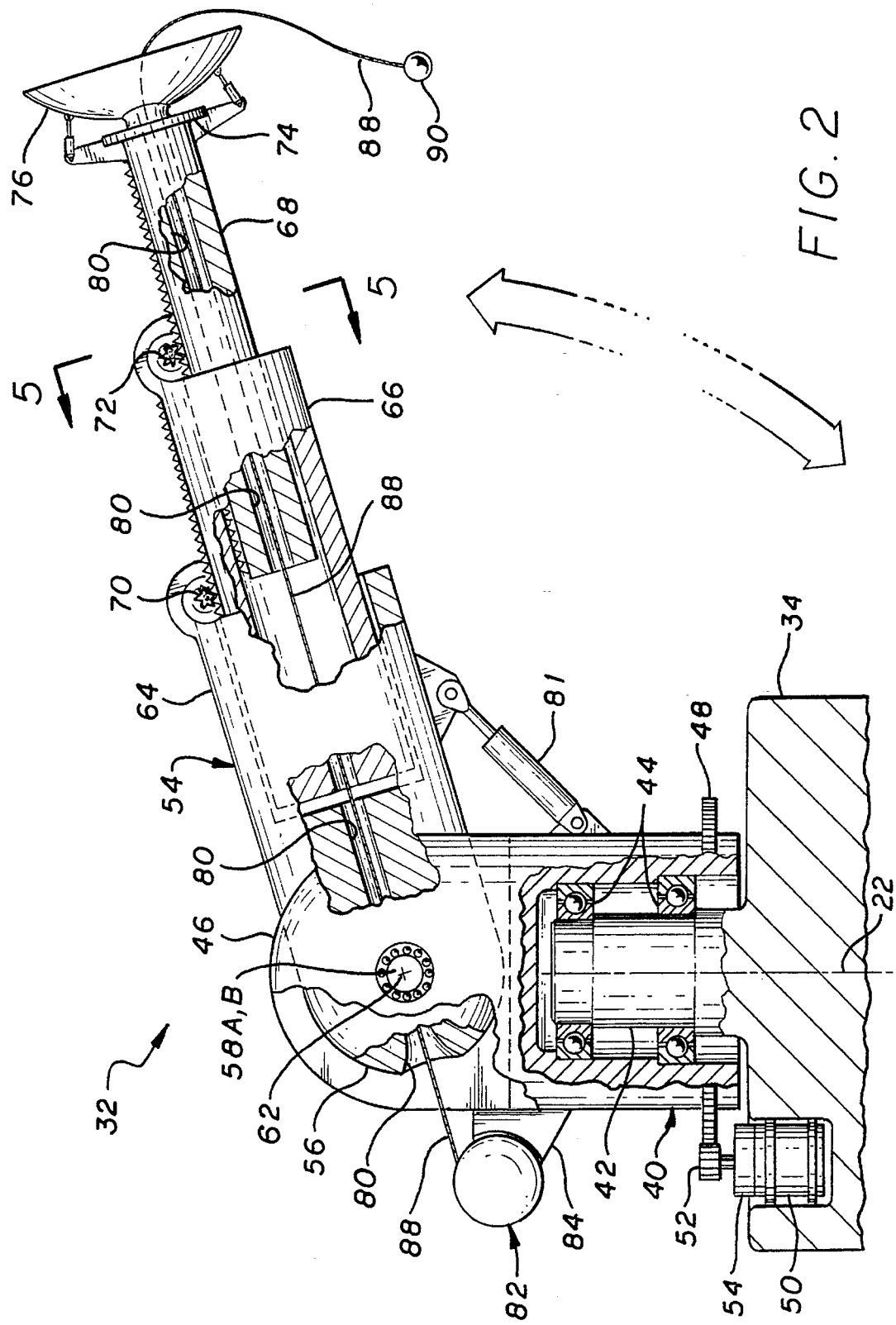
FIG. 2 is an enlarged partial side view of the top of the mooring tower illustrating the vehicle securing system mounted thereon.
Figure 3:
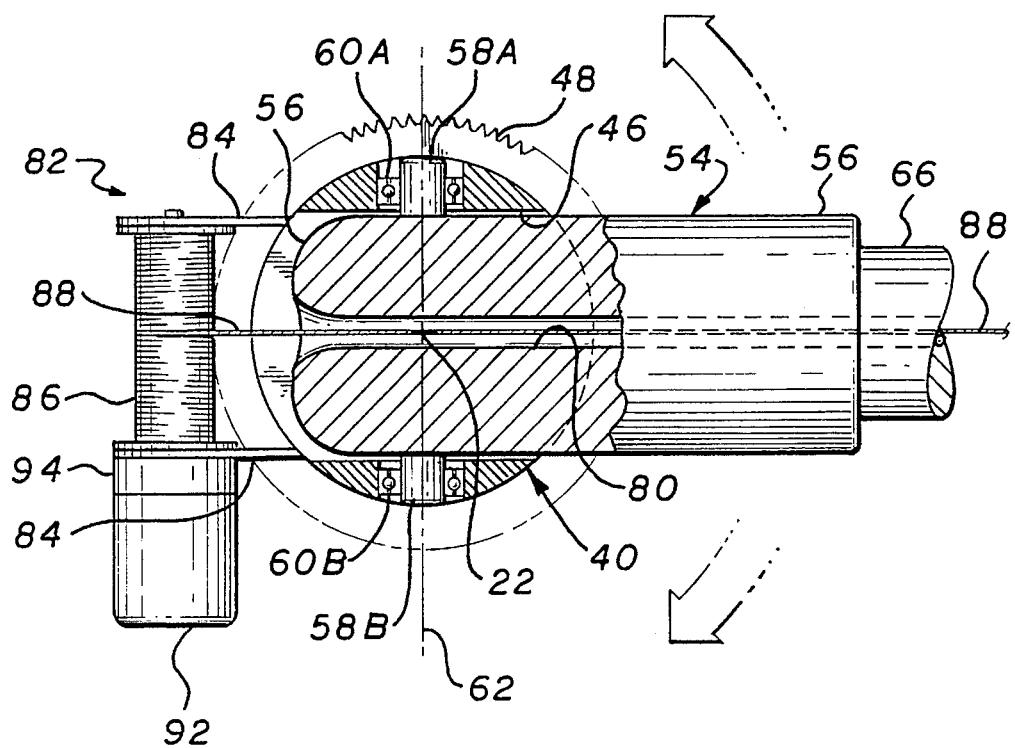
FIG. 3 is an enlarged top view of the vehicle securing system illustrated in FIG. 2.

Referring to FIGS. 2 and 3, the securing system 32 includes a first support member 40 rotatably mounted on a pin 42 mounted to the top 34 of the tower 24 and supported by bearings 44. Thus the first support member 40 is rotatable about the vertical axis of the tower 24 (axis of rotation 22 of the platform 12). The opposite end of the member 40 terminates in a clevis 46. A ring gear 48 is mounted about the bottom of the member 40. A motor 50 (either hydraulic or electric) is mounted on the top 34 of the tower for driving a pinion gear 52 that is engaged with a ring gear 48 on the first support member 40. A clutch 54 is mounted between the motor 50 and pinion gear 52 for that limiting the amount of torque applied to the first support member.

A telescoping second support member 54 includes a first end in the form of a lug 56 having pins 58A and 58B protruding out each side thereof that engage bearings 60A and 60B mounted in the clevis 46. Thus the second support member is rotatable in a vertical plane about a pivot axis 62. The second end 64 of the second support member 54 includes two telescoping members 66 and 68 that are extended and retracted by rack and pinion gear assemblies 70 and 72, respectively that will be subsequently discussed. The end 74 of the member 68 incorporates an adjustable cup shaped member 76 that is adapted to mate with the nose 36 in a manner to be subsequently discussed. The second support member 54 includes an aperture 80 that extends completely therethrough from the lug 56 to the cup shaped member 76. A hydraulic cylinder 81 mounted between the first support member 40 and second support member 54 is used to rotate the second member 54 about the pivot axis 62.

Figure 4:
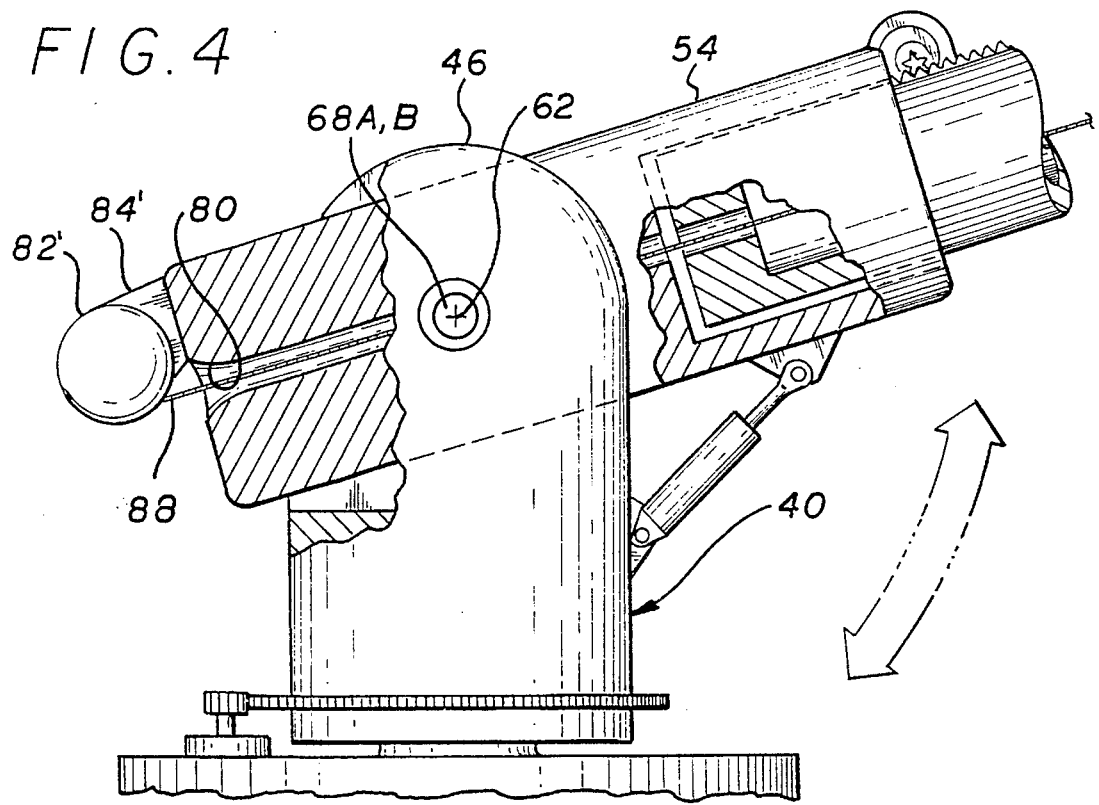
FIG. 4 is a cross-sectional view of the vehicle securing system shown in FIG. 2 illustrating an actuation system for the telescoping end thereof.

A winch assembly 82 is mounted to the first support member 40 by supports 84 and thus is rotatable therewith. The winch assembly 82 includes a drum 86 having a cable 88 wound therearound and which extends through the aperture 80 and out the cup shaped member 76 terminating in a ball coupling 90. The winch assembly 82 is driven by a hydraulic or electrically powered motor 92 via a clutch 94 that controls the amount of force applied to the cable 88. Alternately, a winch assembly 82' can be directly mounted to the lug 56 of the second support member 54, by means of supports 84' as illustrated in FIG. 4. This insures that the cable 88 always remains aligned with the aperture 80 as the member 54 rotates about the pivot axis 62, reducing the friction load between the cable and aperture.

Figure 5:
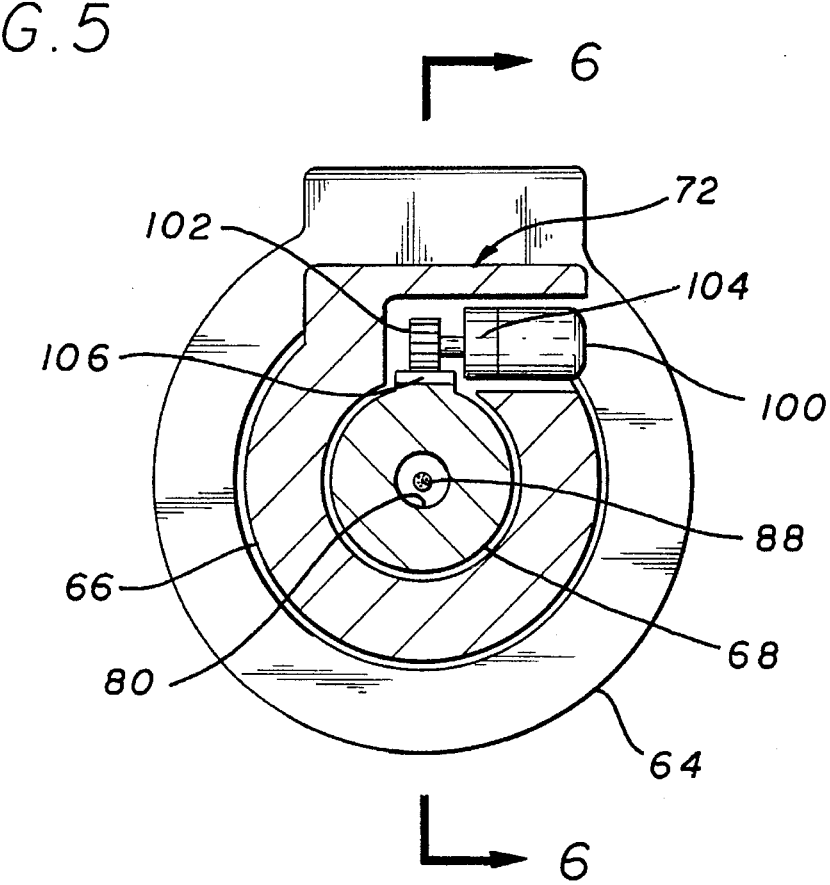
FIG. 5 is a partial cross-sectional view of FIG. 4 illustrating the actuation system for the telescoping second end thereof.
Figure 6:
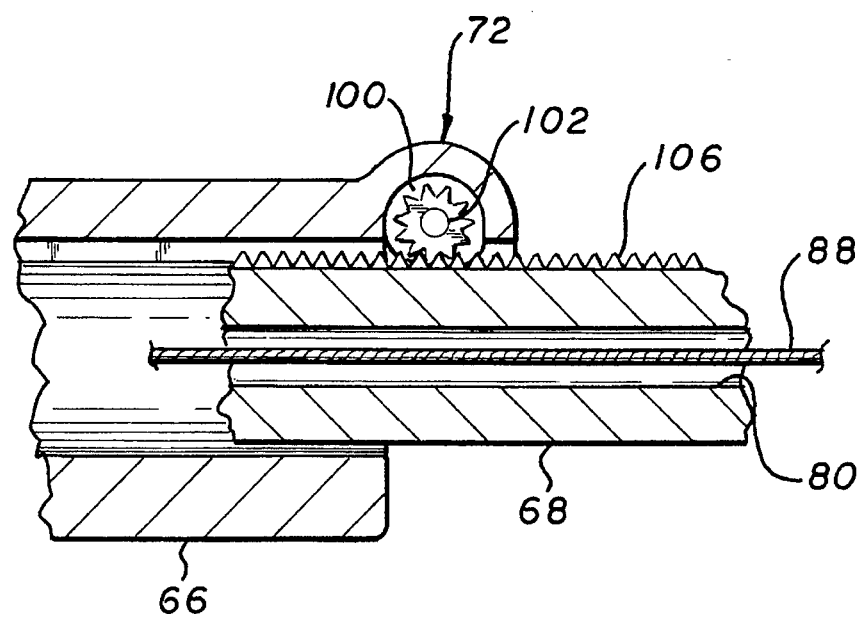
FIG. 6 is a partial cross-section view of FIG. 3 taken along the line 6—6 illustrating the end of the telescoping end of securing system.

Referring to FIGS. 5 and 6, the gear assembly 72 includes a motor 100 for driving a pinion gear 102, via a clutch 104, that engages a rack gear 106 on the member 68. The gear assembly 70 operates in an identical fashion. It should be understood that the above described gear assemblies are just one of many ways that the telescoping members 66 and 68 can be operated. For example, hydraulic systems could be used as disclosed in U.S. Pat. No. 4,177,964 "Docking System For Space Structures" by E. J. Hujsak, et al. As will be subsequently discussed, what is important is that any system used includes means for limiting the amount of resistance to movement of the telescoping members 66 and 68.

Figure 7:
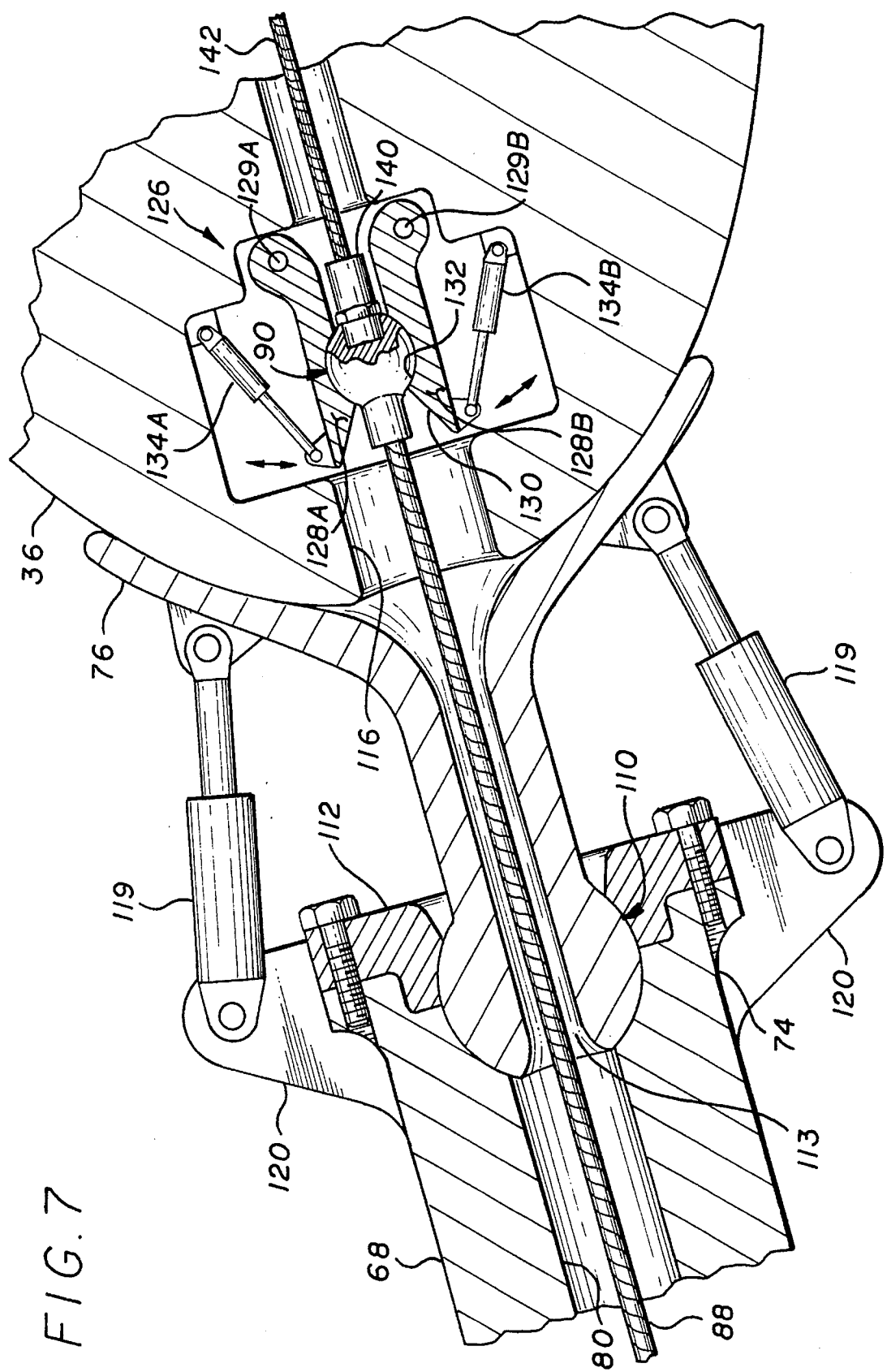
FIG. 7 is a partial side view of a second embodiment of the securing system.

In FIG. 7, the cup shaped member 76 is illustrated coupled to the nose 36 of the vehicle 10 as would be the case when the vehicle 10 is docked as illustrated in FIG. 10. In detail, the member 76 includes a spherical shaped bearing 110 that is rotatably mounted to the end 74 of the telescoping member 68 and is retained thereto by bearing cap 112. An aperture 113 extends through the member 76 and is aligned with an aperture 116 in the nose 36 of the gas bag 14. Four hydraulic dampers 119 are mounted between lugs 120 and the member 76 ninety degrees apart for maintaining alignment thereof with the member 68 (only two are shown) The ball coupling 90 attached to the end of the cable 88 is in releasable engagement with a latch assembly 126 mounted within the nose 36. The latch assembly 126 includes a pair members 128A and 128B that are rotatably mounted by their ends 129A and 129B to support structure in the nose. When closed together they form a conical shaped inlet ramp 130 and a spherical shaped socket 132 for receiving the coupling 90. Hydraulic cylinders 134A and 134B maintain a fixed restraining force on the coupling 90.

Figure 8:
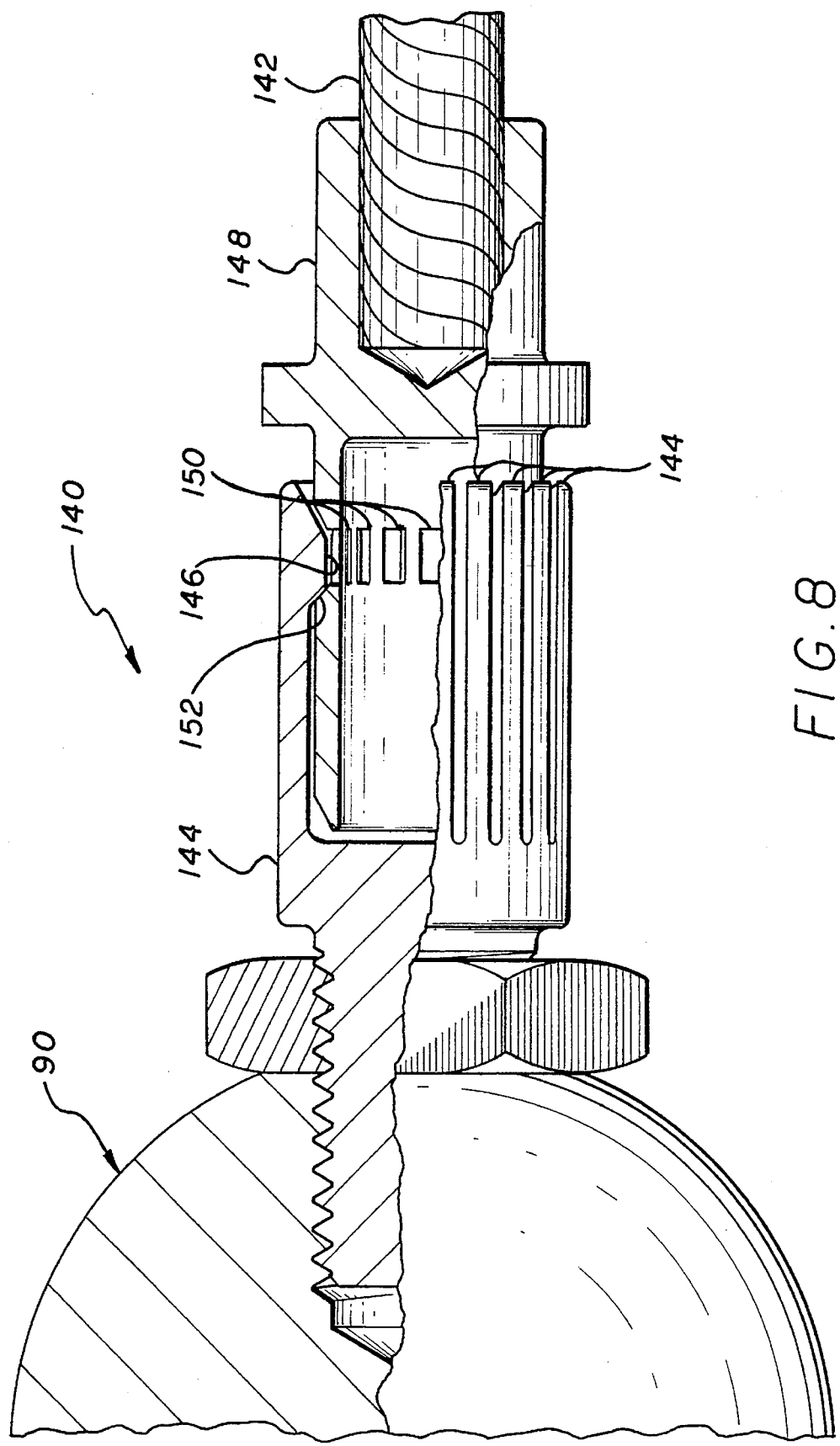
FIG. 8 is a top view of the tower illustrated in FIG. 1 in the process of mooring the nose of the vehicle thereto.

Still referring to FIG. 7 and additionally to FIG. 8, the coupling 90 is also releasably connected by a latch assembly 140 to a line 142 that is extendible from a winch (not shown) mounted within the nose 36. The latch assembly 140 includes a plurality of spring like fingers 144 having inward directed protrusions 146. The line 142 terminates in a fitting 148 having slots 150 for receiving the protrusions 146 by spreading the fingers 144 apart. The protrusions are slightly tapered on one end 152 so that should the force on the line 142 become excessive, the coupling 90 will release from the latching assembly 140.

Figure 9:
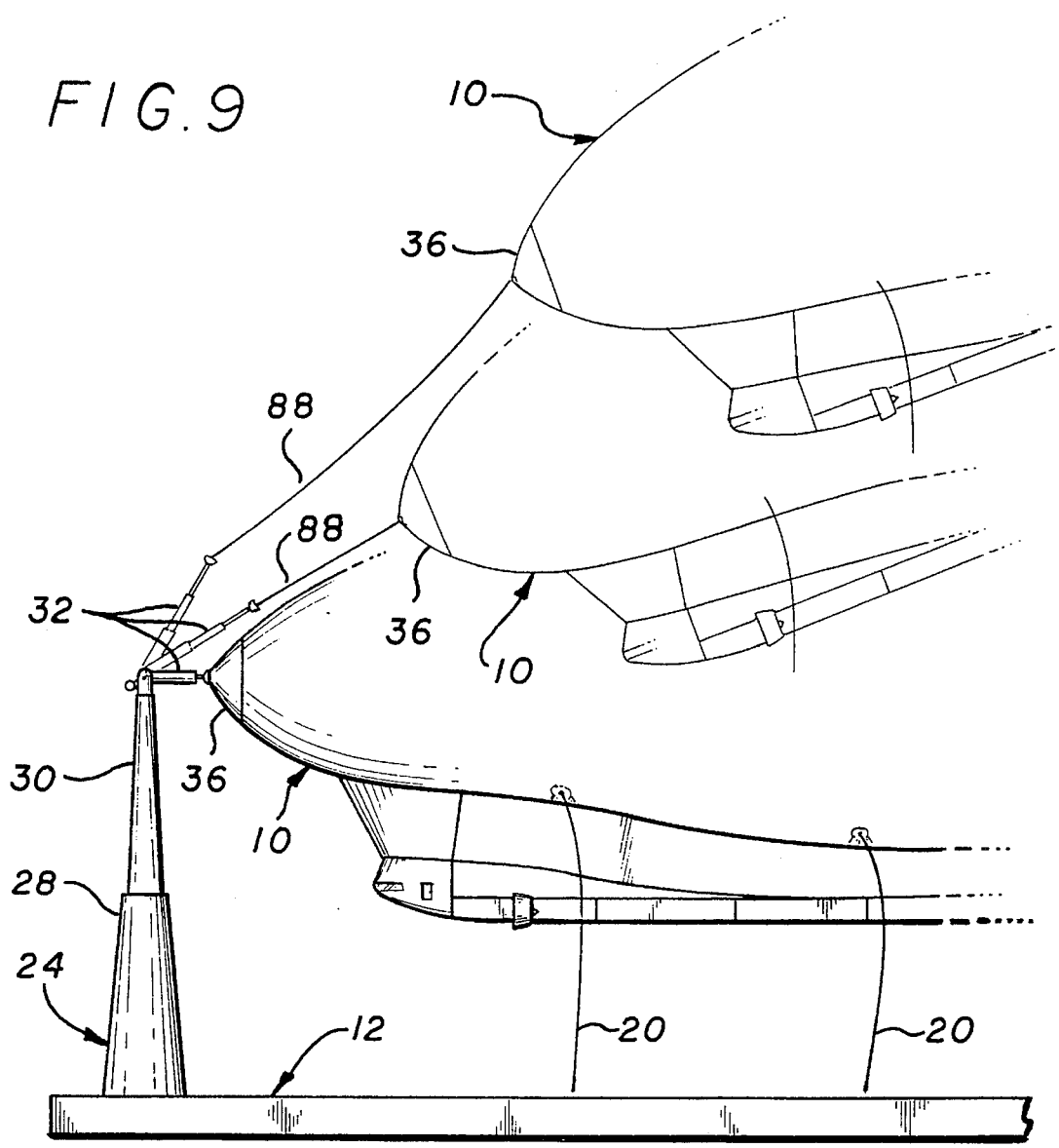
FIG. 9 is a side view of the tower illustrated in FIG. 1 in the process of mooring the nose of the vehicle thereto.

Referring to FIGS. 1–8 and additionally to FIGS. 9–10, as the vehicle 10 approaches the tower 24 and is over the platform 12, the line 142 is lowered from the nose 36 of the vehicle while the cable 88 is lowered from the securing system 32. Ground crew personnel (not shown) on the platform join the latch assembly 140 on the spherical coupling to the fitting 148 on the end of the line 142. The cable 88 and line 14238 are thereafter retracted until the cable 88 is taught between the securing system 32 and nose 36 of the vehicle. Thereafter, the line 142 is retracted and the cable 88 is played out until the cable is pulled into the nose 36, and coupling 90 slides through the conical inlet 130 and is secured in the socket 132. Thereafter, the hydraulic pressure within the cylinders 134A and B is adjusted to releasably lock the coupling 90 within the socket 132. The vehicle 10 is then maneuvered lightly back from the tower 24 by means of the propulsion systems 18 and adjustment of the ballast of the vehicle, while the securing system 32 is extended. Note that the vehicle 10 is always directed into the wind and the platform 12 is also so aligned which greatly reduces the difficulty of docking. The cable 88 is slowly reeled in, separately or simultaneously with the retraction of the telescoping second support member 54 as the vehicle is maneuvered closer to the tower 24. The operator of the securing tower 24 can, of course, extend or retract the second support member, rotate the first support member 40 and reel the cable 88 in or out at will. The "tug of war" continues until the nose 36 of the vehicle is attached to a retracted securing system. Thereafter, the tower is retracted as the mooring lines, now secured by winches, are retracted and the vehicle is pulled down and secured to the platform.

Note that should gusts arise, causing the vehicle to shift position, the clutch 94 on the winch assembly 82, clutch 54 on the motor 50 used to rotate the first support member 50, the clutch on gear assemblies 70 and 72 of the telescoping members 66 and 68 can be adjusted to slip should forces become too great, preventing damage to the vehicle. Additionally, the hydraulic pressure within the hydraulic cylinder 81 used to adjust the position of the second support member 54 can be limited to also prevent excessive force from being applied to the vehicle. As a last resort, if the forces still are to great, the force on the coupling 90 will be sufficient to overcome the latching force applied by the hydraulic cylinders 134A and 134B, and the cable 88 will pull free of the vehicle. Simultaneously, the latch assembly 140 will separate from the fitting 148 of the line 142.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry, and, in particular, to airport construction industry.

I claim:

1. A mooring tower for a lighter-than-air vehicle comprising:

a vertical tower having a vertical and lateral axis;

a first support member mounted on the top of said tower, said first support structure rotatable in a horizontal plane about a vertical axis;

a second support member having a first end mounted to said first support member and a telescoping second end, said second support member rotatable in a vertical plane about its first end, said second support member having an aperture extending therethrough from said first end to said second;

a winch mounted to said first support member and rotatable therewith having a mooring line extending through said aperture in said second member from said first end to and out said second end thereof;

such that a vehicle having said mooring line attached to the nose thereof can be winched to said tower.

2. The mooring tower as set forth claim 1 comprising said winch positioned on said first member such that said mooring line extending from said winch is substantially aligned with said aperture.

3. The mooring tower as set forth in claim 2 comprising means to rotate said first support structure in said horizontal plane.

4. The mooring tower as set forth in claim 3 comprising second means to rotate said second support member in said vertical plane.

5. The mooring tower as set forth in claim 4 comprising third means to limit the force applied by said first means to said first support member.

6. The mooring tower as set forth in claim 5 comprising fourth means to limit the force applied by said second means to said second support member.

7. The mooring tower as set forth in claim 1, or 3, or 4, or 5, or 6, comprising said tower having a telescoping top portion such that said top of said tower is movable upwards and downwards.

8. The mooring tower as set forth in claim 7 including fifth means coupled to said winch for reeling in said line.

9. The mooring tower as set forth in claim 8 including sixth means coupled to said winch for limiting the amount of force applied to said line.

10. The mooring tower as set forth in claim 6 comprising:

said first support member having a second end in the form of a clevis having a pin mounted therein; and said second end of said second member in the form of a lug rotatably mounted to said pin.

11. The mooring tower as set forth in claim 1, or 3, or 4, or 5, or 6, wherein said first means comprises:

a ring gear mounted on said first support member:

a motor mounted on said tower; said motor having a pinion gear in engagement with said ring gear.

12. The mooring tower as set forth in claim 1, or 3, or 4, or 5, or 6, wherein said third means comprises a clutch mounted between said pinion gear and said motor.

13. The mooring tower as set forth in claim 1, or 3, or 4, or 5, or 6, wherein said second means comprises a hydraulic cylinder mounted between said first and second support.

14. The mooring tower as set forth in claim 13 wherein said fourth means is a an adjustable pressure regulator for regulating the hydraulic pressure within said hydraulic cylinder.

* * * * *